United States Patent
Kister et al.

(10) Patent No.: US 7,590,414 B2
(45) Date of Patent: Sep. 15, 2009

(54) WIRELESS TELEPHONE FOR RECEIVING A MEDIA STREAM WHILE PLACING A CALL

(75) Inventors: Thomas F. Kister, Chalfont, PA (US); Prema Venkatesulu, Yardley, PA (US)

(73) Assignee: General Instrument Corporation, Horsham, PA (US)

( * ) Notice: Subject to any disclaimer, the term of this patent is extended or adjusted under 35 U.S.C. 154(b) by 293 days.

(21) Appl. No.: 11/300,117

(22) Filed: Dec. 14, 2005

(65) Prior Publication Data

US 2007/0135102 A1 Jun. 14, 2007

(51) Int. Cl.
*H04M 3/00* (2006.01)
(52) U.S. Cl. .................... 455/414.1; 455/419
(58) Field of Classification Search ........... 455/414.1, 455/414.2, 415, 419, 420
See application file for complete search history.

(56) References Cited

U.S. PATENT DOCUMENTS

| 2005/0075102 | A1* | 4/2005 | Minko ..................... 455/420 |
| 2006/0072144 | A1* | 4/2006 | Dowling et al. ............ 358/1.15 |
| 2007/0117551 | A1* | 5/2007 | Boris et al. .............. 455/414.1 |

OTHER PUBLICATIONS

International Search Report, Jul. 28, 2008.

* cited by examiner

*Primary Examiner*—Sam Bhattacharya
(74) *Attorney, Agent, or Firm*—Stewart M. Wiener (57) ABSTRACT

A method using a wireless telephone (102) for placing a call is provided. The method includes receiving (202) a media stream over a first channel (110). The method also includes rendering (204) the media stream on the wireless telephone. Moreover, the method opens (206) a second channel (116) for a voice call while receiving the media stream over the first channel.

13 Claims, 6 Drawing Sheets

WIRELESS TELEPHONE FOR RECEIVING A MEDIA STREAM WHILE PLACING A CALL

FIELD OF THE INVENTION

This invention relates in general to the field of wireless telephones and in particular, to a wireless telephone capable of rendering a media stream while placing a call.

BACKGROUND OF THE INVENTION

With the advent of technology, wireless telephones are being preferred as compared to wired landline telephones. The wireless telephones are easier to handle and are portable. Some wireless telephones are also capable of playing live media streams, such as audio streams and video streams. For example, the media stream that is rendered at the wireless telephone is transmitted from a remote location by a camera. The camera detects motion and transmits the media stream to the wireless telephone. The camera can be placed by the user at any location the user wants to monitor. For example, if the user wishes to monitor the entrance of his/her house, then a camera that is able to broadcast the media stream through a wireless network may be positioned at the entrance of the house. In another case, a microphone may be used to receive audio streams at the location the user wants to monitor.

In a typical situation, the camera alerts the wireless telephone about an incoming media stream, informing the user of an emergency situation at the remote location. Consider a case, when there is an emergency situation such as, a burglary or a fire in the house. In such a situation the user would ideally like to call an emergency service immediately. The user is able to place an emergency call after receiving and viewing the media stream. Additionally, the emergency situation requires an urgent response from the user to call the emergency service.

For example, the incoming media stream may apprise the user about a burglary taking place in his house. In this case, the user would like to call up the police and inform the police about the burglary. At the same time, the user would like to inform the police about the exact location of the burglar, his/her movements and the weapons being carried by him/her. In another example, the user may receive an alert from the camera just because a broken branch from a tree breaks the window of his/her house. In this case, the user need not call an emergency service.

BRIEF DESCRIPTION OF THE DRAWINGS

Various embodiments will hereinafter be described in conjunction with the appended drawings provided to illustrate and not to limit the invention, wherein like designations denote like elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In this document, relational terms such as first and second, top and bottom, and the like may be used solely to distinguish one entity or action from another entity or action without necessarily requiring or implying any actual such relationship or order between such entities or actions. The terms 'comprises,' 'comprising', 'includes', 'including', or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by 'comprises . . . a' does not, without more constraints, preclude the existence of additional identical elements in the process, method, article, or apparatus that comprises the element.

The term 'another', as used herein, is defined as at least a second or more. The terms 'including' and/or 'having', as used herein, are defined as comprising.

A "set" as used in this document, means a non-empty set (i.e., comprising at least one member). The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, source code, object code, a shared library/dynamic load library and/or other sequence of instructions designed for execution on a computer system.

Figure 1:
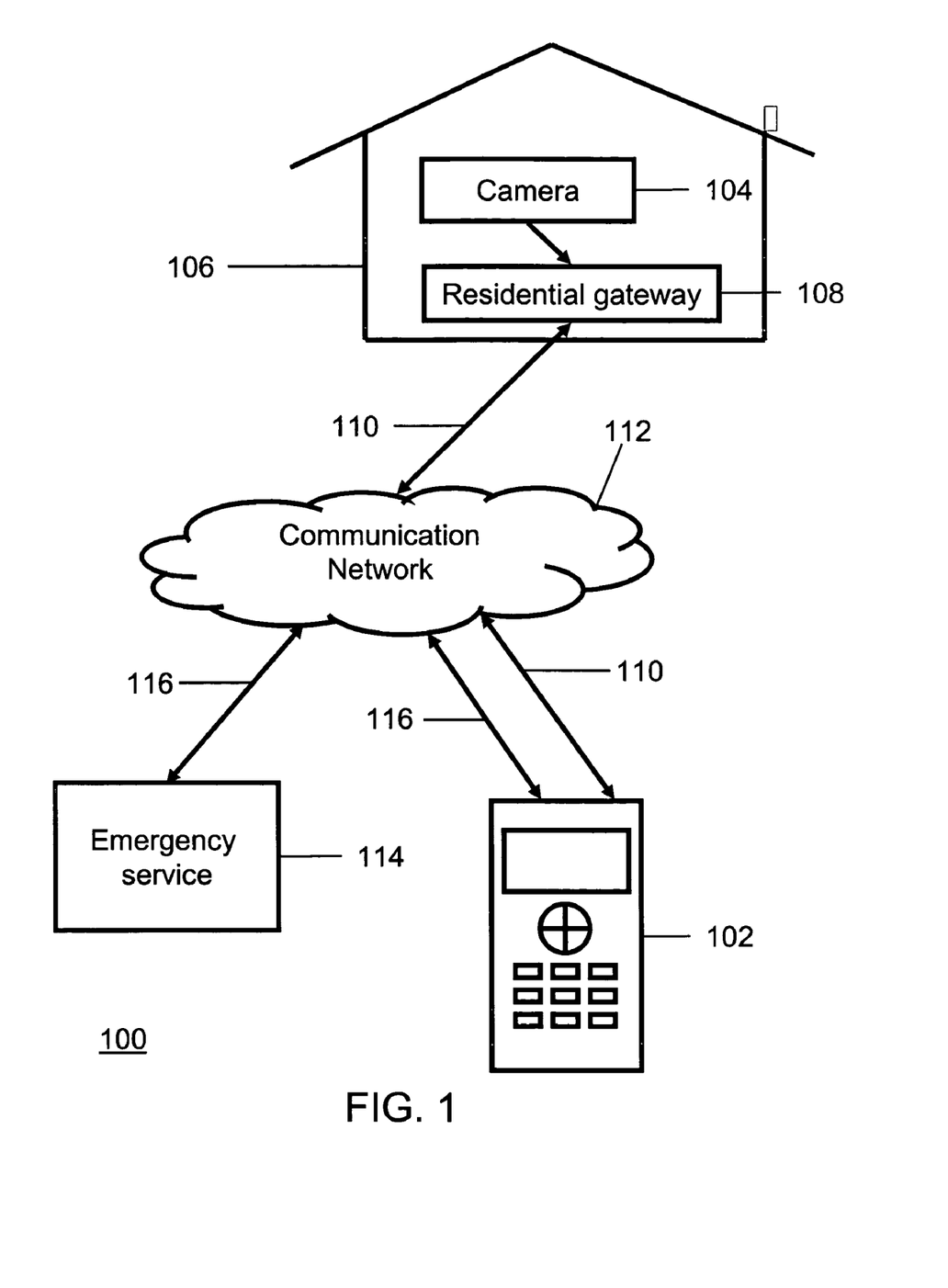
FIG. 1 shows an illustrative environment in which a wireless telephone receives a media stream while processing a call.

FIG. 1 shows an illustrative environment in which a wireless telephone receives a media stream while processing a call. The figure illustrates a wireless telephone 102 capable of receiving and rendering a media stream. The media stream is sent by a camera 104 placed at a remote location 106. As an example, the camera 104 detects movements at the remote location 106. These movements may be an indication of an emergency situation at the remote location 106. In another illustration, the camera 104 includes an integrated sensor, which detects the movements at the remote location 106. The remote location 106 can be any location chosen for monitoring by a user of the wireless telephone 102. For example, if the user wishes to monitor the entrance of his/her house, i.e., the remote location 106, then the camera 104 may be positioned at the entrance of the remote location 106. The camera 104 transmits the media stream captured at the remote location 106 to a residential gateway 108. The residential gateway 108 then transmits the media stream over a first channel 110 to the wireless telephone 102. A channel is a logical path or other connection for exchange of data between a source and a destination. As an example, the channel is a frequency at which the source and the destination communicate. In an illustrative method, the media stream is sent over the first channel 110 via a communication network 112. Examples of the communication network 112 include, but are not limited to, the Internet, a local area network, a mobile network and the like. In another illustrative method, the communication network 112 also includes a server, which facilitates communication between the residential gateway 108 and the wireless telephone 102. In an illustrative method, the server may be used to store the media stream transmitted by the residential gateway 108 in case the user of the wireless telephone 102 does not respond to the incoming media stream. There may be a case when the wireless telephone 102 is not within a network coverage area or it has a low power left in the battery. In such a case, the stored media stream at the server may be transmitted to the user whenever the wireless telephone 102 is accessible by the server.

The media stream enables a user of the wireless telephone 102 to be informed of an emergency situation at the remote location 106. In this case, the user of the wireless telephone 102 can place a call to an emergency service 114, over a second channel 116 while receiving the media stream over the first channel 110. Examples of the emergency service 114 include, but are not limited to, a police department, a fire department, and a security service. Consider a case, when there is an emergency situation such as a break-in in a house, i.e., the remote location 106. The user of the wireless telephone 102 would immediately like to report the burglary to the police department. The user is able to call the police department over the second channel 116 while receiving the media stream from the residential gateway 108, located at the remote location 106 over the first channel 110.

Figure 2:
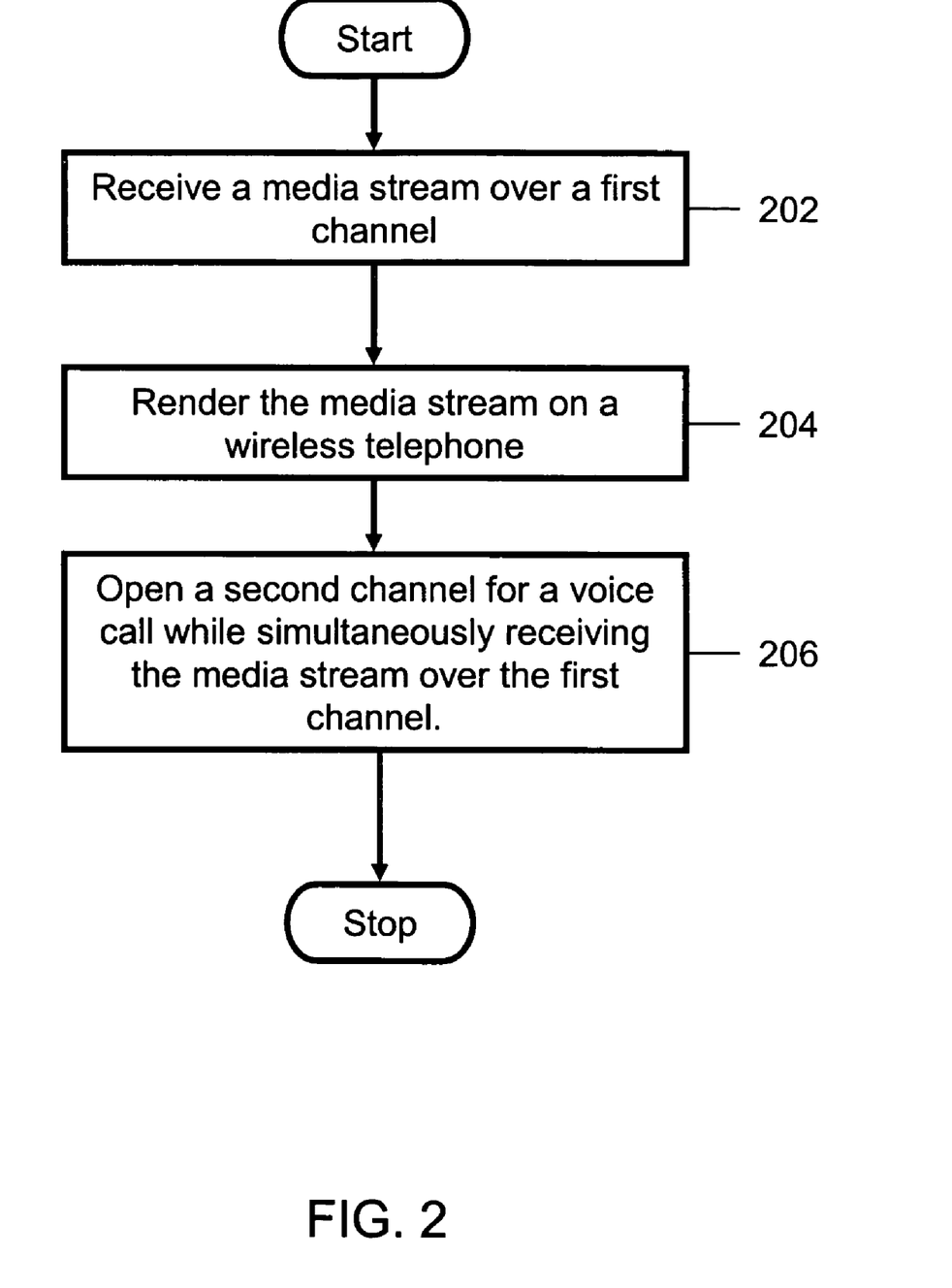
FIG. 2 shows a flowchart for processing a call while receiving a media stream on a wireless telephone.

FIG. 2 shows a flowchart for processing a call while receiving a media stream on a wireless telephone 102. At step 202, the wireless telephone 102 receives the media stream over the first channel 110 from the residential gateway 108 placed at the remote location 106. In an illustrative method, an alert notification notifies the user about an incoming media stream. In another case, the user proactively makes a request for the media stream to the residential gateway 108. At step 204, the media stream is rendered on the wireless telephone 102. Rendering the media stream includes processing the media stream and playing the media steam. In one case, the media stream enables the user of the wireless telephone 102 to be informed about an emergency situation at the remote location 106. At step 206, the wireless telephone 102 opens the second channel 116 for placing a voice call to the emergency service 114, while receiving the media stream. In other words, the user of the wireless telephone 102 can see the media stream being received over the first channel 110, and place the call to the emergency service 114 over the second channel 116.

Figure 3:
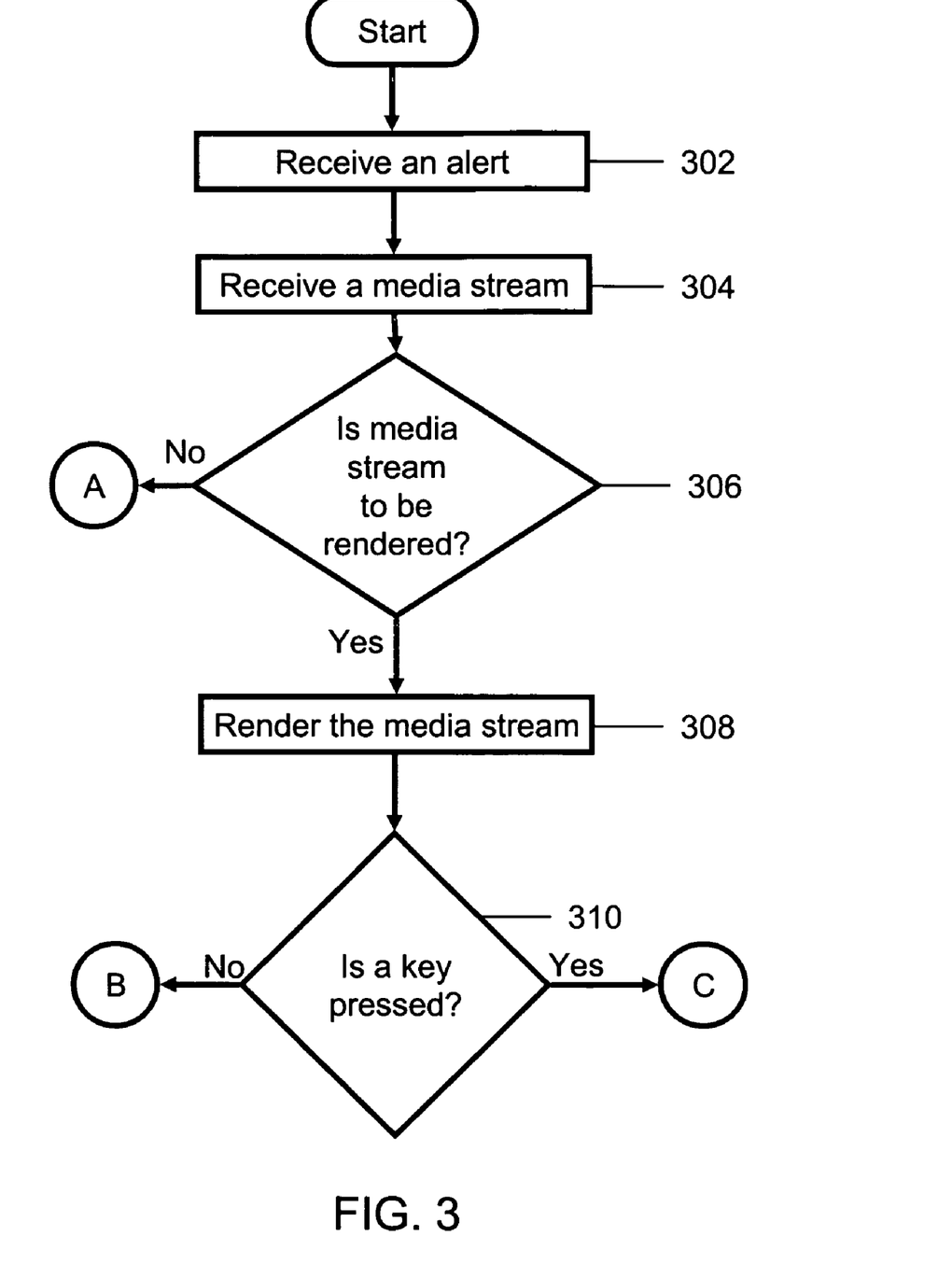
FIGS. 3 and 4 show a flowchart for processing a call while receiving a media stream on a wireless telephone.
Figure 4:
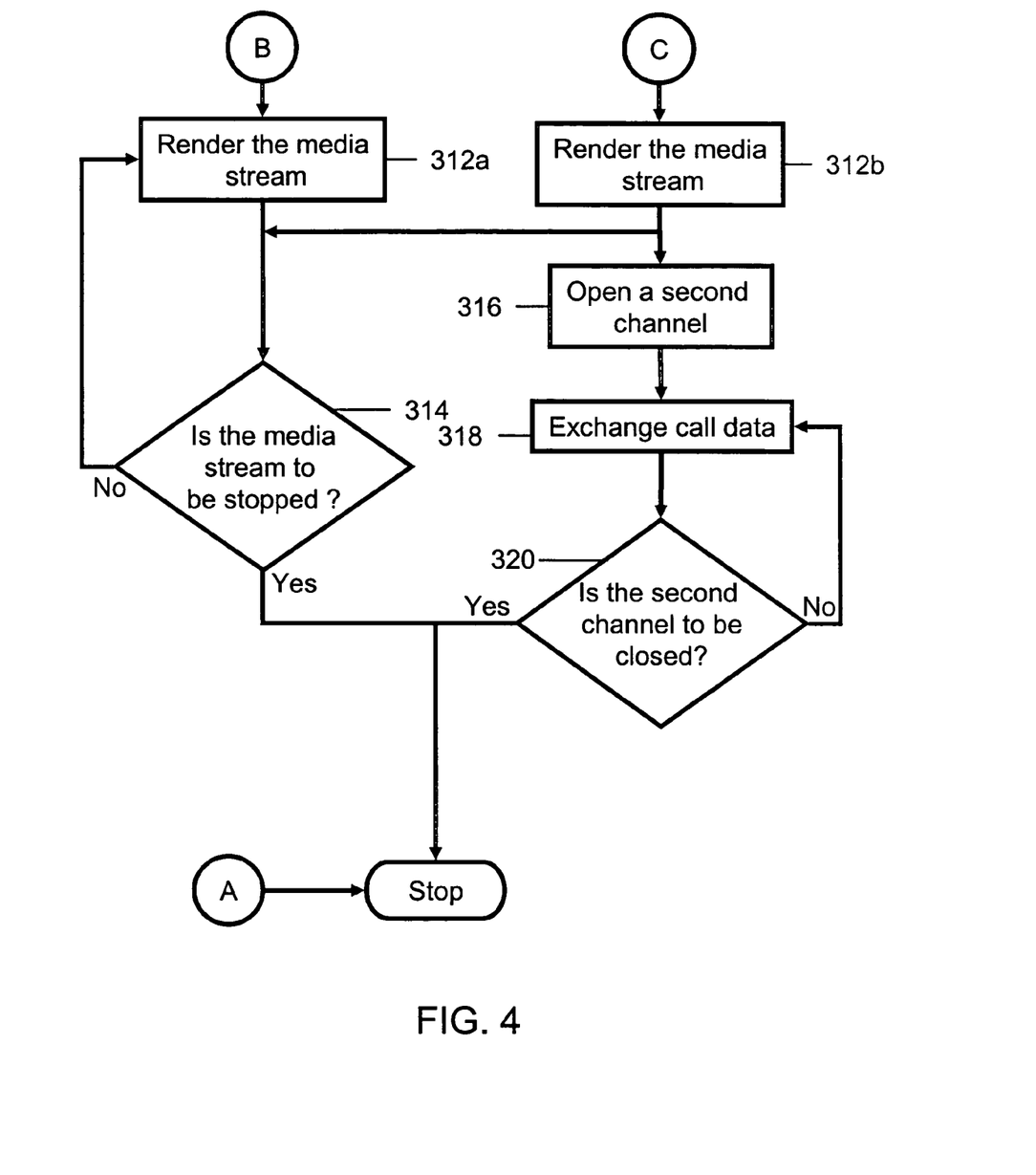

FIGS. 3 and 4 show a flowchart for processing a call while receiving a media stream on a wireless telephone. At step 302, the user of the wireless telephone 102 receives an alert notification from the residential gateway 108 notifying the user about an incoming media stream. Examples of an alert notification include, but are not limited to, a sound beep, a ringer, and a light indicator from or on the wireless telephone 102. At step 304, the wireless telephone 102 receives the media stream. At step 306, the user is asked whether to render the media stream. The receiving of the media stream is analogous to receiving of a call. The user may or may not want to receive the media stream and hence the user may not open the clamshell of the wireless telephone or may press a key to reject the incoming media stream. Hence, the user is given an option of accepting the media stream or rejecting the media stream. At step 308, the media stream is rendered on the wireless telephone 102 if the user chooses to render the media stream at step 306. If the user chooses not to render the media stream, the method is terminated. At step 310, it is checked whether one or more keys on the wireless telephone 102 are pressed for placing a call to the emergency service 114. For example, a key may be present on the wireless telephone 102 for placing a call to the police and another key for placing a call to the fire department and likewise. All the above-mentioned keys may be soft keys or hard keys present on the wireless telephone 102. The user may choose to call any emergency service 114 by pressing any key corresponding to an emergency service. In another illustrative method, it is also possible that the user calls up the emergency service 114 by pressing a combination of more than one key. At step 312a, the wireless telephone 102 continues to render the media stream if the one or more keys are not pressed in step 310.

At step 314, the wireless device 102 offers the user an option to stop the media steam. The wireless telephone 102 continues to render the media stream if the user chooses to continue rendering the media stream at step 312a. If the user chooses to stop the media stream at step 314, the media stream is stopped and the method terminates. If the key is pressed at step 310, the wireless telephone 102 continues to render the media stream at step 312b. At step 316, the second channel 116 is opened for placing the voice call. In an illustrative method, the second channel 116 is opened by a single key press. The single key press uses a preconfigured speed dial setting. At step 318, data pertaining to the voice call is exchanged between the wireless telephone 102 and the emergency service 114. At step 320, the user is given the option of closing the second channel 116. If the second channel 116 is kept open at step 320, the exchange of data is continued at step 318. If the second channel 116 is closed at step 320, the method terminates.

Figure 5:
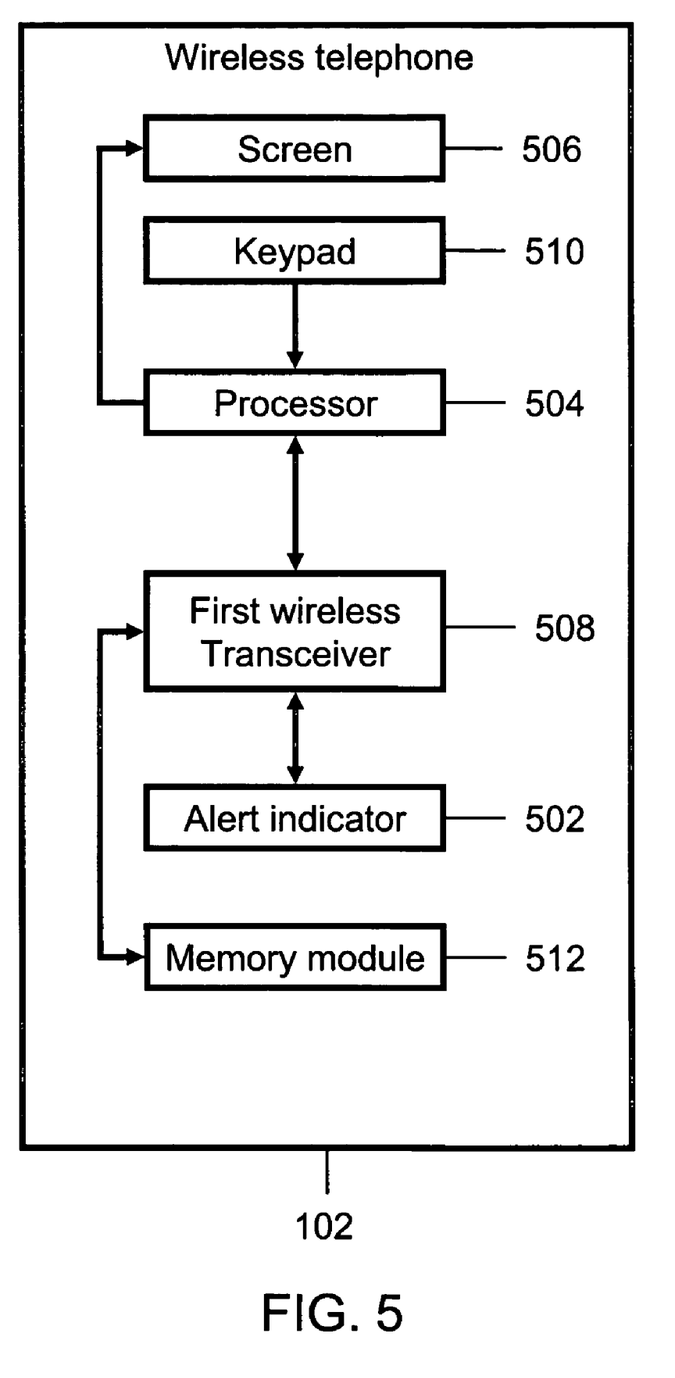
FIG. 5 is a block diagram of a wireless telephone that receives a media stream while processing a call.

FIG. 5 is a block diagram of a wireless telephone that receives a media stream while processing a call. The wireless telephone 102 includes an alert indicator 502, a processor 504, a screen 506, a first wireless transceiver 508, a keypad 510, and a memory module 512. The first wireless transceiver 508 receives the media stream over the first channel 110 from the remote location 106. The media stream is transmitted by the residential gateway 108. The alert indicator 502 notifies the user of the wireless telephone 102 about the incoming media stream. In one case, the media stream informs the user of the wireless telephone 102 of an emergency situation at the remote location 106. Examples of the alert indicator include, but are not limited to, a beeper, a light emitting diode (LED), a ringer, and the like.

The processor 504 is operatively coupled to the first wireless transceiver 508. The processor 504 receives the media stream from the first wireless transceiver 508 as an input, and outputs output data. The output data is a processed form of the media stream received by the first wireless transceiver 508. In an illustrative system, the media stream is processed in a format that can be rendered by the wireless telephone 102. For example, the media stream received by the processor 504 is encoded and compressed according to standards, such as H.264 or motion picture expert group (MPEG-4). The processor 504 then decodes and de-compresses the stream so that the screen 506 is able to display the media stream. The screen 506 is coupled to the processor 504. In an illustrative system, the output data is a video feed, which is displayed on the screen 506. In another illustrative system, the wireless telephone 102 includes a speaker, which is capable of playing the output data in the form of an audio stream. In this case, the wireless telephone 102 receives an audio stream along with the video stream from the camera 104. The first wireless transceiver 508 present in the wireless telephone 102 opens the second channel 116 for placing a call to the emergency service 114. The call placed on the second channel 116 is a voice call. The first wireless transceiver 508 exchanges the voice data with the emergency service 114, while the output data is simultaneously being rendered by the screen 506.

Further, the first wireless transceiver 508 opens the second channel 116 when a single key or a combination of keys on the keypad 510 is pressed. The key(s) press is sensed by the processor 504, which then instructs the first wireless transceiver 508 to open the second channel 116. The single key on the keypad 510 is either one or more soft keys or a hard key on the wireless telephone 102. The second channel 116 opened by pressing the single key on the keypad 510 uses a preconfigured speed dial setting. In an illustrative system, the second channel 116 is opened when a plurality of keys on the keypad 510 are pressed. The data exchanged over the first channel 110, or the data exchanged over the second channel 116, is recorded in the memory module 512. The data stored in the memory module 512 can be used as evidence of the emergency service 114. For example, a video recording in the memory module 512 can be used as evidence against a burglar involved in a burglary.

Figure 6:
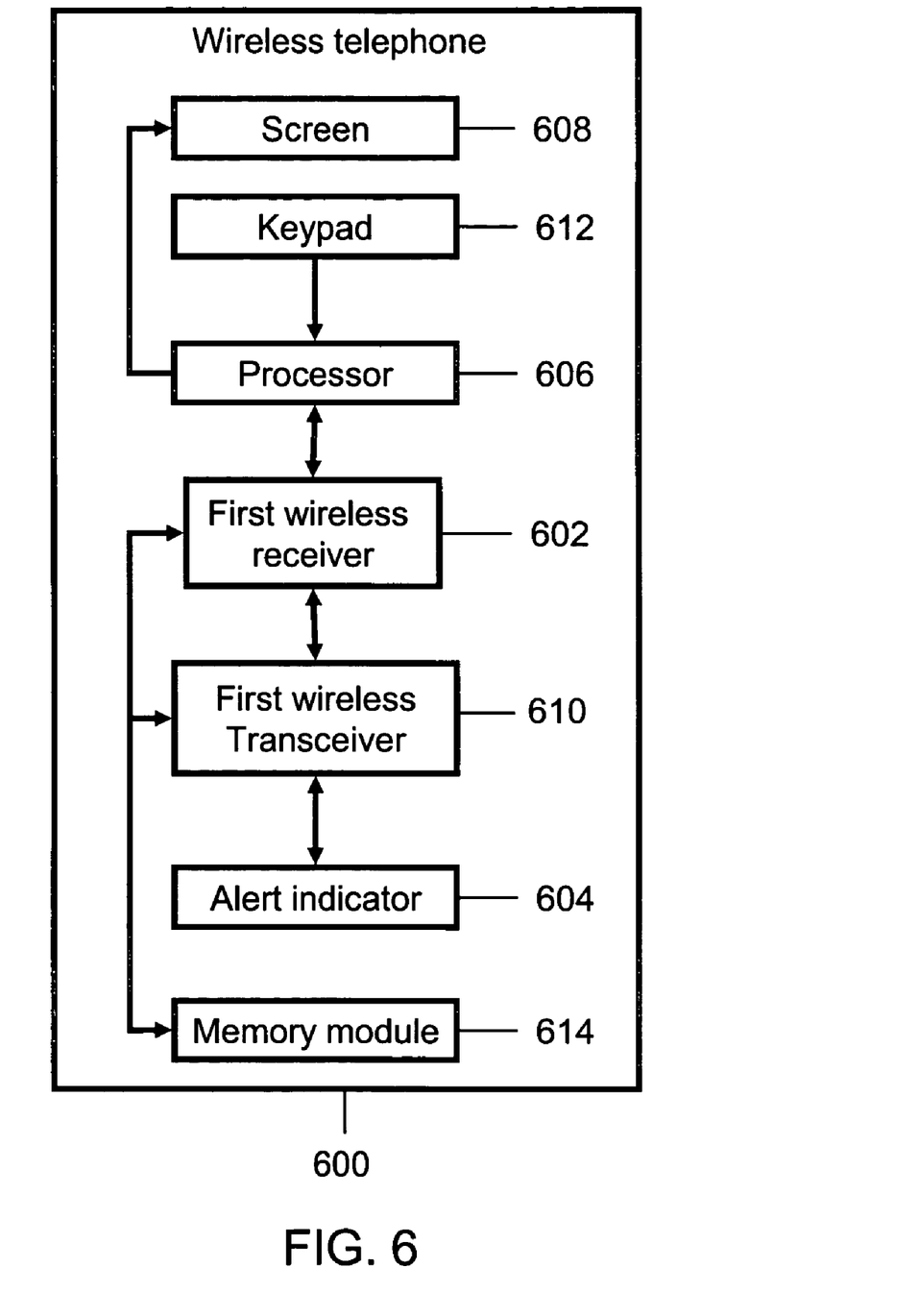
FIG. 6 is another illustrative block diagram of a wireless telephone that receives a media stream while processing a call.

FIG. 6 is another illustrative block diagram of a wireless telephone 600 that receives a media stream while processing a call. The wireless telephone 600 includes a first wireless receiver 602, an alert indicator 604, a processor 606, a screen 608, a first wireless transceiver 610, a keypad 612, and a memory module 614. The alert indicator 604, the processor 606, the screen 608, the first wireless transceiver 610, the keypad 612, and the memory module 614 are essentially similar to the components included in the wireless telephone 102, i.e., the alert indicator 502, the processor 504, the screen 506, the first wireless transceiver 508, the keypad 510, and the memory module 512. The functioning of both the wireless telephones 102 and 600 are similar barring the inclusion of the first wireless receiver 602 as an individual component in the wireless telephone 600. The first wireless receiver 602 receives the media stream over the first channel 110 from the remote location 106 as explained in detail in conjunction with FIG. 5. The first wireless transceiver 610 handles and processes the call data between the user and the emergency service 114.

As described above, the present invention provides a wireless telephone and a method for receiving a media stream while placing a call. The present invention provides an improvement in the existing wireless telephone, since it enables the user to place a call while rendering the media stream. This is useful since it enables the user to describe an emergency situation at a remote location to an emergency service. In addition, in certain emergency situations, it is imperative to make an urgent call to the emergency service. The facility of calling the emergency service with a single key press is advantageous in such situations.

It will be appreciated the wireless telephone as described herein may be comprised of one or more conventional processors and stored program instructions that control the one or more processors to implement, in conjunction with certain non-processor circuits the functions of the wireless telephone described herein. The non-processor circuits may include, but are not limited to, a radio receiver, a radio transmitter, signal drivers, clock circuits, power source circuits, and user input devices. As such, these functions may be interpreted as steps of a method to perform (the described method). Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and structures for these functions have been described herein.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by the examples described above.

What is claimed is:

1. A method for placing a call through a wireless telephone, the method comprising:
   receiving a media stream at the wireless telephone from a first device over a first channel;
   rendering the media stream on the wireless telephone; and
   at the wireless telephone, opening a second channel with a second device for a voice call while receiving the media stream from the first device over the first channel, wherein the first device is remote to the wireless telephone.

2. The method of claim 1, wherein opening the second channel for the voice call is performed by pressing a single key on the wireless telephone.

3. The method of claim 1 further comprising receiving an alert notification on the wireless telephone, wherein the alert notification notifies the wireless telephone of an incoming media stream.

4. A wireless telephone comprising:
   a first wireless receiver that receives a media stream from a first device over a first channel;
   a processor coupled to the first wireless receiver that receives the media stream from the first wireless receiver and outputs output data;
   a screen coupled to the processor that receives the output data from the processor and renders the media stream; and
   a first wireless transceiver coupled to the processor for exchanging call data with a second device over a second channel for a voice call;
   wherein the processor can continue to receive the media stream from the first device while simultaneously processing the call data for the voice call with the second device, wherein the first device is remote to the wireless telephone.

5. The wireless telephone of claim 4 further comprising a plurality of keys, wherein the processor instructs the first wireless transceiver to open the second channel in response to at least one key of the plurality of keys being pressed.

6. The wireless telephone of claim 4, wherein the first wireless receiver is a part of the first wireless transceiver.

7. The wireless telephone of claim 4 further comprises an alert indicator for receiving an alert notification, wherein the alert notification notifies the wireless telephone of an incoming media stream.

8. The wireless telephone of claim 4 further comprises a memory module, wherein the memory module is capable of recording the media stream.

9. The wireless telephone of claim 4, wherein the processor decodes the media stream from the first wireless receiver to form the output data before sending the output data to the screen.

10. The wireless telephone of claim 4, wherein the first device is one of a camera, sensor, or a residential gateway.

11. The wireless telephone of claim 4, wherein the second device is communication device of an emergency service.

12. A computer readable medium comprising instructions for controlling a wireless telephone, the instructions comprising:

receiving a media stream at the wireless telephone from a first device over a first channel;

rendering the media stream on the wireless telephone; and at the wireless telephone, opening a second channel with a second device for a voice call while receiving the media stream from the first device over the first channel, wherein the first device is remote to the wireless telephone.

13. The computer readable medium of claim 12, further comprising instructions for receiving an alert notification on the wireless telephone, wherein the alert notification notifies the wireless telephone of an incoming media stream.

* * * * *